(12) United States Patent
Chen et al.

(10) Patent No.: US 9,279,169 B2
(45) Date of Patent: Mar. 8, 2016

(54) METHOD FOR RECYCLING NOBLE METALS FROM FISCHER-TROPSCH PRODUCTS

(71) Applicant: SUNSHINE KAIDI NEW ENERGY GROUP CO., LTD., Wuhan (CN)

(72) Inventors: Yilong Chen, Wuhan (CN); Jiaqi Jin, Wuhan (CN); Yanfeng Zhang, Wuhan (CN); Kan Song, Wuhan (CN); Xiaodong Zhan, Wuhan (CN); Manyi Jiang, Wuhan (CN)

(73) Assignee: SUNSHINE KAIDI NEW ENERGY GROUP CO., LTD., Wuhan (CN)

( * ) Notice: Subject to any disclaimer, the term of this patent is extended or adjusted under 35 U.S.C. 154(b) by 0 days.

(21) Appl. No.: 14/578,539

(22) Filed: Dec. 22, 2014

(65) Prior Publication Data

US 2015/0105480 A1 Apr. 16, 2015

Related U.S. Application Data

(63) Continuation-in-part of application No. PCT/CN2013/074696, filed on Apr. 25, 2013.

(30) Foreign Application Priority Data

Jun. 29, 2012 (CN) .......................... 2012 1 0223062

(51) Int. Cl.

| C07C 1/04 | (2006.01) |
| C22B 61/00 | (2006.01) |
| C22B 11/02 | (2006.01) |
| B01J 23/75 | (2006.01) |
| C10G 31/09 | (2006.01) |
| C21B 15/00 | (2006.01) |
| C22B 3/00 | (2006.01) |
| C22B 7/00 | (2006.01) |

(52) U.S. Cl.
CPC ................. C22B 61/00 (2013.01); B01J 23/75 (2013.01); C10G 31/09 (2013.01); C21B 15/00 (2013.01); C22B 7/009 (2013.01); C22B 11/026 (2013.01); C22B 23/04 (2013.01); C10G 2300/1022 (2013.01); C10G 2300/205 (2013.01); C10G 2300/208 (2013.01); Y02W 30/54 (2013.01)

(58) Field of Classification Search
CPC .............. C07C 1/04; C10G 2/00; C10G 2/32; C10G 2/33; B01D 24/48; B01D 33/76
See application file for complete search history.

(56) References Cited

U.S. PATENT DOCUMENTS

| 6,616,734 B2 * | 9/2003 | Liu .................................. 95/282 |
| 2013/0171040 A1 * | 7/2013 | Ha et al. ......................... 422/187 |

FOREIGN PATENT DOCUMENTS

| CN | 1944588 A | * | 4/2007 |
| CN | 202237500 U | * | 5/2012 |
| WO | WO 2012/036377 A4 | * | 3/2012 |

* cited by examiner

*Primary Examiner* — Sudhakar Katakam
(74) *Attorney, Agent, or Firm* — Matthias Scholl, PC; Matthias Scholl (57) ABSTRACT

A method for recycling a noble metal from Fischer-Tropsch synthesis products. The method includes: 1) filtering a reaction product in a Fischer-Tropsch synthesis reactor by an inner filter; discharging a filtered reaction product to a first filtration buffer tank; separating a gas phase product or a part of a liquid phase product from the reaction product; introducing the liquid-solid two-phase product to a refining filter for product refining; 2) introducing a liquid phase product containing a catalyst slurry to a dynamic filter, collecting the filtered liquid phase product including a waste catalyst and noble metal ions; introducing the liquid phase product to a second filtration buffer tank; and introducing the filtered liquid phase product to the refining filter; and 3) forming a clay filter cake on a filter disk; and refining the products introduced into the refining filter in 1) and 2).

11 Claims, 4 Drawing Sheets

METHOD FOR RECYCLING NOBLE METALS FROM FISCHER-TROPSCH PRODUCTS

CROSS-REFERENCE TO RELATED APPLICATIONS

This application is a continuation-in-part of International Patent Application No. PCT/CN2013/074696 with an international filing date of Apr. 25, 2013, designating the United States, now pending, and further claims priority benefits to Chinese Patent Application No. 201210223062.X filed Jun. 29, 2012. The contents of all of the aforementioned applications, including any intervening amendments thereto, are incorporated herein by reference. Inquiries from the public to applicants or assignees concerning this document or the related applications should be directed to: Matthias Scholl P. C., Attn.: Dr. Matthias Scholl Esq., 245 First Street, 18th Floor, Cambridge, Mass. 02142.

BACKGROUND OF THE INVENTION

1. Field of the Invention

The invention relates to a combined filtering method for recycling noble metals from Fischer-Tropsch synthesis products.

2. Description of the Related Art

Noble metals such as platinum, palladium, rhodium, silver, and ruthenium, have high catalytic activities and excellent high temperature resistance, oxidation resistance, and corrosion resistance. However, the noble metals are expensive, which greatly restricts the application thereof.

Conventional technologies for recycling noble metal catalysts include distillation, an outer filter method, and an inter filter method. However, the involved reactor is often expensive. The filtration accuracy is low, the heavy distillate still contains significant amounts of catalysts, and the waste catalyst in the reactor cannot be recycled. The returning route of the catalyst and the filter are often blocked, thereby affecting the normal operation of the reactor. In addition, improper operation easily destroys the filter cloth.

SUMMARY OF THE INVENTION

It is one objective of the invention to provide a combined filtering method for a recycling noble metal from Fischer-Tropsch synthesis products. The method solves the recovery of the waste noble metal catalyst, provides possibility for the regeneration and the recovery of the waste catalyst, lowers the production cost of the noble metal catalyst, and therefore promotes the wide application of the noble metal catalyst. In addition, the method of the invention also effectively solves the separation of any liquid-solid two-phase (or gas-liquid-solid three-phase) reaction product and ensures the quality of the product.

Technical scheme of the invention is as follows: a combined filtering method for recycling a noble metal from Fischer-Tropsch synthesis products, the method comprising:

1) continuously filtering a reaction product in a Fischer-Tropsch synthesis reactor by an inner filter; discharging a filtered reaction product to a first filtration buffer tank via an upper outlet of the Fischer-Tropsch synthesis reactor; separating a gas phase product or a part of a liquid phase product from the reaction product and discharging the gas phase product or the liquid phase product from a top of the first filtration buffer tank to a product outlet; discharging a liquid-solid two-phase product from a bottom part of the first filtration buffer tank and introducing the liquid-solid two-phase product to a refining filter for product refining;

2) introducing a liquid phase product containing a catalyst slurry from a bottom part of the Fischer-Tropsch synthesis reactor to a dynamic filter, collecting the filtered liquid phase product comprising a waste catalyst in the form of small broken particles and noble metal ions; separating the liquid phase product from a bottom part of the dynamic filter and introducing the liquid phase product to a second filtration buffer tank; and introducing the liquid phase product to the refining filter from a bottom part of the second filtration buffer tank to conduct product refining; and 3) forming a clay filter cake on a filter disk; and refining the products introduced into the refining filter in 1) and 2).

In a class of this embodiment, the liquid-solid two-phase products obtained in 1) and 2) are cooled to a temperature of 180±20° C. in the first filtration buffer tank and the second filtration buffer tank before the liquid-solid two-phase products are transported to the refining filter.

In a class of this embodiment, the dynamic filter in 2) has a filtration temperature of 200 and 400° C., a pressure of 3.0 and 5.0 MPa (G), and a filtration accuracy of between 1 and 25 μm.

In a class of this embodiment, the filter disk of the dynamic filter in 2) has a maximum allowable pressure difference of 2.5 MPa and a filtration pressure difference in normal filtration of between 0.6 and 2.0 MPa. When the filtration pressure difference exceeds 2.0 MPa, the rotational speed of the variable frequency motor is increased so as to remove the filter residue by a centrifugal force. The removal of the filter residue won't be finished until the filtration pressure difference is lower than 50 kPa. The rotational speed of the variable frequency motor is then decreased and the normal filtration operation is conducted.

In a class of this embodiment, the dynamic filter in 2) is provided with a variable frequency motor. A rotational speed of a filter disk is controlled at between 10 and 100 rpm in conditions of normal filtration and at between 100 and 300 rpm in conditions of removal of filter residue. The dynamic filter has a dynamic filtration process alternating between filter cake filtration and non-filter cake filtration.

In a class of this embodiment, the product in the refining filter in 3) is treated by a combination of the product refining process and a filter cake filtration. The clay filter cake is formed in the refining filter before the filtration of the product, and the refining filtration is then conducted. The formation of the clay filter comprises: stirring and mixing a clay in a precoating mixing tank, transporting the clay into the refining filter via a pump; increasing a circulating flow of a clay mixture when the filter disk of the refining filter is totally immersed by the clay mixture and a thin layer of the clay filter cake is formed on a surface of the filter cake; compacting the clay filter cake; and discharging the clay mixture.

In a class of this embodiment, the refining filter in 3) has a filtration temperature of between 100 and 200° C., a pressure of between 0.6 and 1.0 MPa (G), and a filtration accuracy of between 0.1 and 1 μm.

In a class of this embodiment, the product in 3) in the refining filter is statically filtered. When a filtration pressure difference reaches 1.0 MPa which is a maximum allowable pressure difference of the filter disk, all inlet valves of the refining filter are closed, a centrifuge is started to remove the layer of the clay filter cake from the filter disk so as to shed the clay and the filter residue down to a conical part of a bottom part of the refining filter, and a bottom outlet of the refining filter is opened to discharge the clay and the filter residue. The formation process of the clay filter cake is repeated after the discharge of the clay and the filter residue and a next filtration operation is conducted after the formation of the clay filter cake.

In a class of this embodiment, the dynamic filter in 2) has a filtration temperature of 200 and 250° C., a pressure of 3.0 and 3.5 MPa (G), and a filtration accuracy of between 5 and 10 μm.

Advantages of the invention is as follows: the method of the invention is based on intensively study on reaction characteristics of the liquid-solid two-phase or gas-liquid-solid three-phase slurry bed reactor and combines the use of new materials and new technologies to realize effective separation of the catalyst from the product. Besides, the method of the invention is particularly focused on the recovery of the noble metal waste catalyst, provides possibility for recovering noble metals, and promotes the industrial application of the noble metal catalyst.

The method of the invention decreases the energy consumption of the apparatus. The dynamic filter and the product refining filter adopt the special filter structures and new materials so that the filtration of the catalyst is realized at high temperature. Compared with low temperature filtration methods, in conditions of adopting hot feeding means in the subsequent processing of the products, the method of the invention does not only improve the filtration effect but also decreases the energy consumption for cooling the apparatus and the energy consumption necessitated in the upgrading and heating processes of the products in subsequent processing, thereby largely decreasing a comprehensive energy consumption. Meanwhile, the high pressure filtration of both the filters can be realized (the product refining filter can be constructed to be applicable for high pressure filtration), which effectively decreases the energy consumption necessitated by the pressure boosting in the subsequent high pressure processing.

The combined filtration method of the invention properly integrates the inner filtration, the outer filtration, the dynamic filtration, and the product refining, so that the recovery of the waste catalyst is realized, and the quality and the outcome of the product are improved. The inner filter effectively prevents of the unbroken catalyst from being lost from product draining routes on the top or the side of the reactor. The catalyst in the product is recovered and utilized by the dynamic filter functioning in the outer filtration. The product is refined by the product refining filter using the combination process of the clay refining and the filtration and the waste catalyst in small broken particles and noble metal ions carried out by the liquid phase product are discharged. What's more important is that the combined filtration process solves the blockage and unstable performance of the filtration system of the slurry bed, thereby providing possibility for long term and stable operation of the slurry bed, realizing one overhaul every three years, and largely improving the production period of the slurry bed. Meanwhile, the stable and better qualified materials are provided to downstream processing operations, so that a long term operation of the downstream processing operations is ensured.

The combined filtration method of the invention is tested by a pilot apparatus, and it is known from the test results that the recovery rate of the waste noble metal catalyst accounts for 95 wt. % of a total amount of the unbroken catalyst, a solid content of the product is no larger than 5 ppm, which strongly confirms the good effect of the method of the invention. Thus, the invention explores a feasible method for recovering the waste noble metal catalyst and ensuring the quality of the product.

DETAILED DESCRIPTION OF THE EMBODIMENTS

Technical solution of the invention is illustrated with detailed embodiments hereinbelow, the embodiments, however, should not be explained as limitation of the protection range of the invention.

Figure 1:
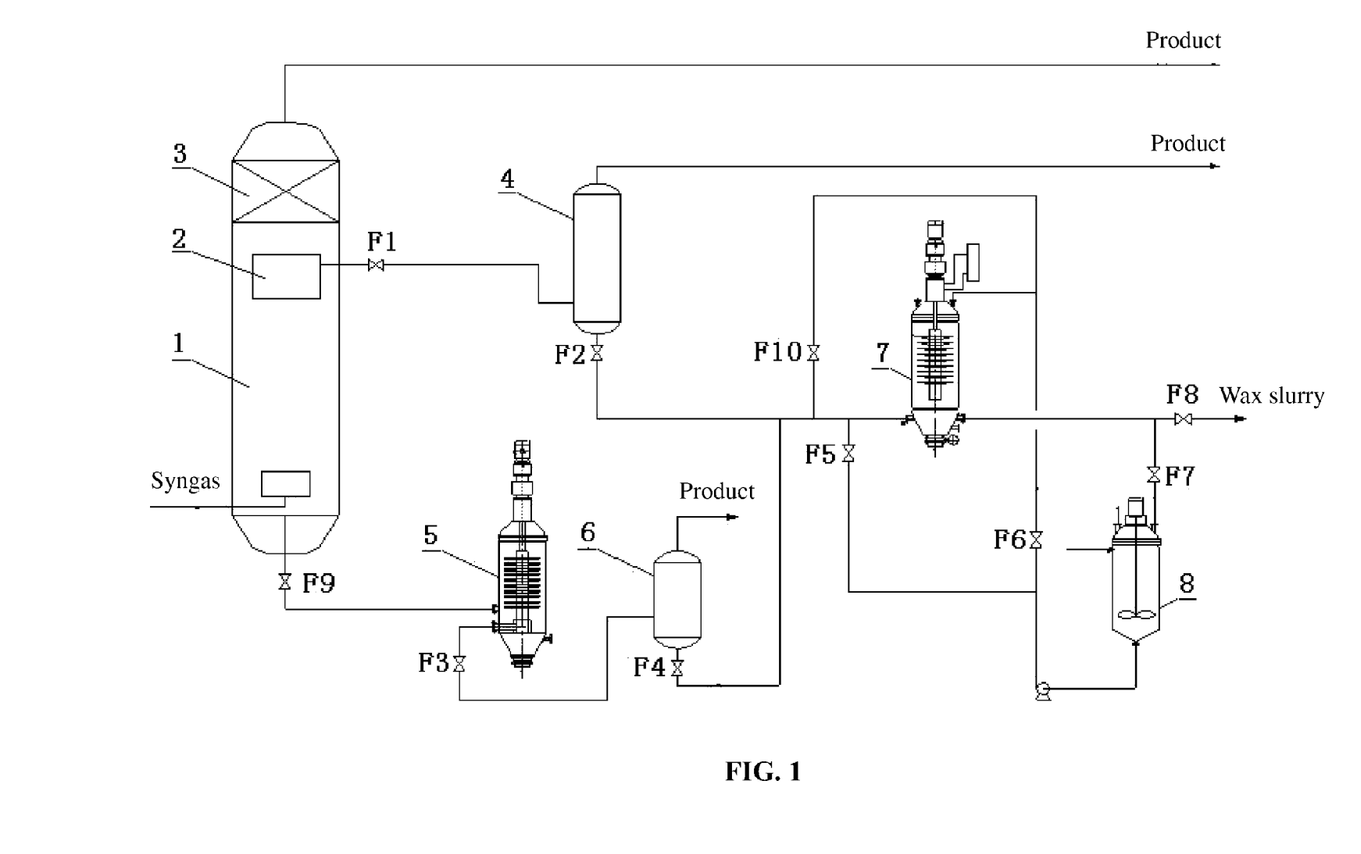
FIG. 1 is a schematic diagram of a system for conducting a combined filtering method for recovering a noble metal catalyst from Fischer-Tropsch synthesis products of the invention.

FIG. 1 is a schematic diagram of a system for conducting a combined filtering method for recovering a noble metal catalyst from Fischer-Tropsch synthesis products of the invention.

The system of the invention comprises: a liquid-solid two-phase or gas-liquid-solid three-phase Fischer-Tropsch reactor 1, an inner filter 2 (be a wire mesh, a wedge mesh, sintered powder, or aeronautical materials), a demister system 3, a first filtration buffer tank 4, a dynamic filter 5, a second filtration buffer tank 6, a product refining filter 7, a precoating mixing tank 8, and valves F1, F2, F3, F4, F5, F6, F7, F8, F9, and F10 disposed on pipelines.

A reaction product in an upper part of the Fischer-Tropsch reactor 1 is filtered by the inner filter 2 and enters the first filtration buffer tank 4. The inner filter 2 continuously discharges the reaction product. A top part of the first filtration buffer tank 4 is capable of separating a gas phase product or a part of a liquid phase product from the product, and a liquid-solid two-phase product discharged from a bottom part of the first filtration buffer tank 4 is introduced into the refining filter 7 for product refining.

An outlet of a bottom part of the Fischer-Tropsch reactor 1 intermittently or continuously discharges materials. When a catalytic activity is not strong enough during the operation of the reactor or when the reactor is stopped to replace a catalyst, the product is discharged from the bottom part of the Fischer-Tropsch reactor, and the product is introduced into the dynamic filter 5. After being filtered by the dynamic filter 5, unbroken waste catalyst particles are separated from the product in the bottom of the dynamic filter and are recovered for reuse. A liquid phase product after filtration contains the waste catalyst in small broken particles and noble metal ions dissolved therein. The liquid phase product then enters the second filtration buffer tank 6 for preparation of entering the product refining filter 7 for product refining.

Before refining filtration of the product by the product refining filter 7, it is required to form a clay filter cake on a filer disk. And product refining process is utilized to refine the reaction product after formation of the filter cake.

The inner filter 2 has a filtration accuracy of between 15 and 35 μm so as to prevent the unbroken noble metal catalyst from discharging out of the reactor. The inner filter 2 adopts a metal composite ceramic membrane sintered porous material, a metal sintered mesh, or a wedge mesh. This kind of materials have large permeability coefficient, controllable pore size and porosity, high filtration accuracy, good separation effect, and excellent bending strength, and are extensively used in gas-liquid or liquid-solid two-phase or gas-liquid-solid three phase separation environment in the presence of high temperature and corrosion and adapted to a plurality of acids or alkali corrosive media. Besides, such materials have excellent regeneration property and a filtration property can be recovered to 90 wt. % above after the regeneration, and therefore the materials can be repeatedly used for multiple times, and the service life thereof is long. The inner filter in the slurry reactor utilizes reverse mixing feature of the slurry reactor to achieve fast formation and shedding of the filter cake in the inner filter. Meanwhile, an outer surface of the inner filter 2 contacting with the reaction product is coated with a nanoscale material (a polytetrafluoroethylene (teflon), a nanoceramic, SiC, $Si_3N_4$, and a modified nanoscale $SiO_2$). The nanoscale material is oleophobic, corrosion resistant, and high temperature resistant and prevents the filter cake from being attached to the inner filter, which is beneficial for the fast shedding of the filter cake and thereby realizing a long term operation of the inner filter.

Figure 2:
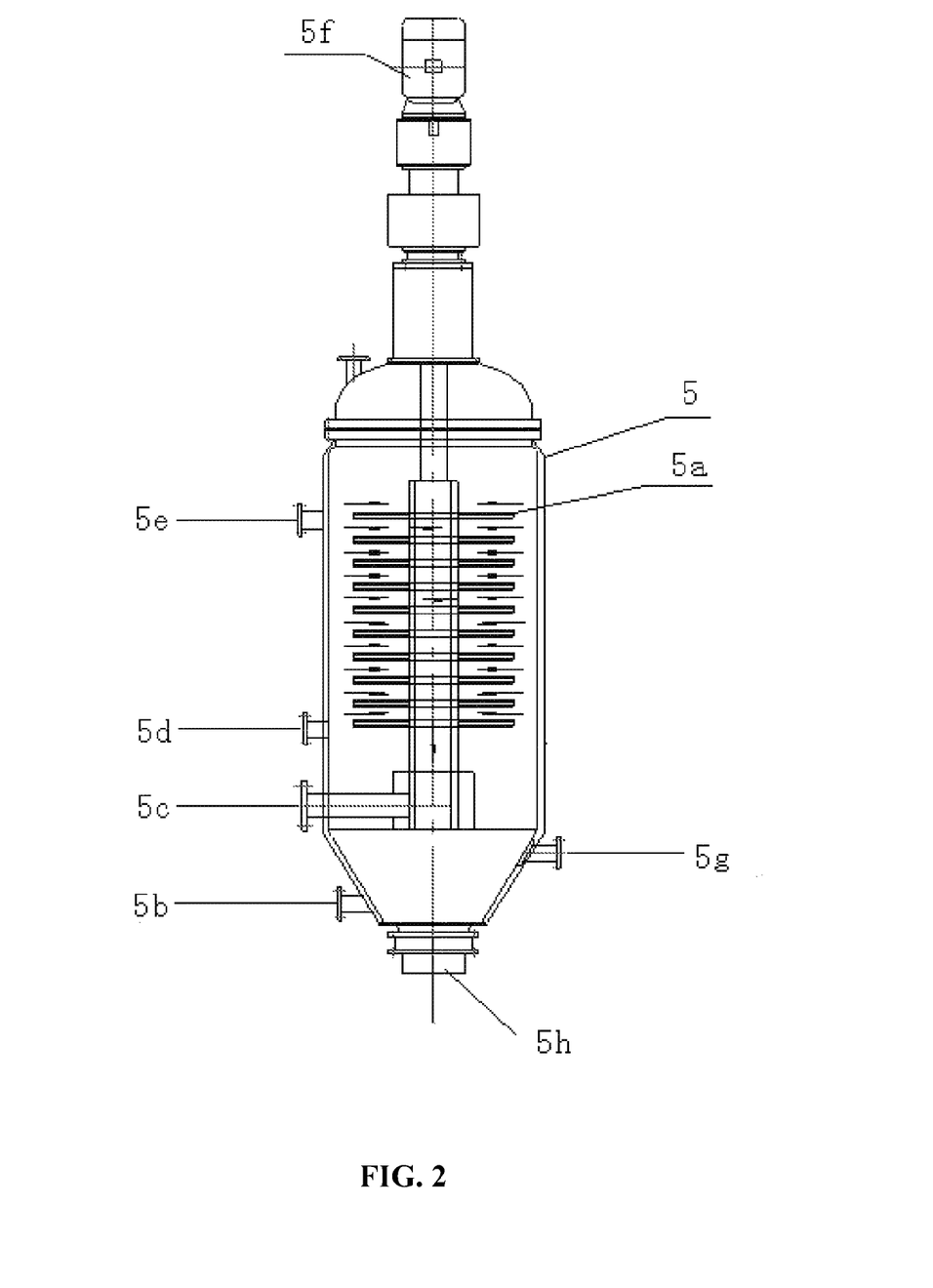
FIG. 2 is a schematic diagram of a dynamic filter of the invention.

FIG. 2 is a schematic diagram of the dynamic filter of the invention. The dynamic filter 5 comprises: a filter disk 5a, a condensate outlet 5b, a filtrate outlet 5c, a slurry inlet 5d, a vapor inlet 5e, a variable frequency motor 5f (with a rotational speed range of between 10 and 300 rpm), a remaining material outlet 5g, and a catalyst outlet 5h.

Figure 3:
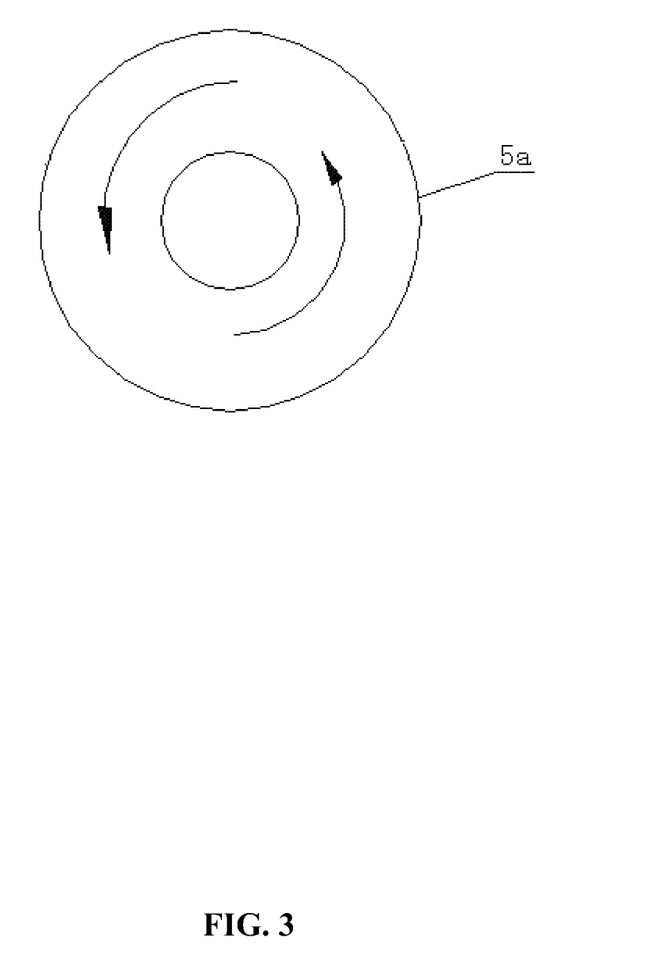
FIG. 3 is a schematic diagram showing flow of materials on a surface of a disk plate of a dynamic filter.

The dynamic filter 5 is a kind of self-made highly efficient horizontal disk type dynamic filter which adopts filter elements made of a sintered metal porous material having good strength and high filtration accuracy and a fully sealed structure and a direct dynamic filtration method in order to recover undissolved shed noble metals or unbroken noble metal catalysts from the product in the bottom outlet of the reactor. The dynamic filter 5 has a temperature range of between 200 and 400° C. and a pressure range of between 3.0 and 5.0 MPa (G), and a filtration accuracy of the dynamic filter 5 is controlled at between 1 and 25 μm. Meanwhile, an upper surface of the filter disk of the dynamic filter is coated with a nanoscale surface agent (with a thickness of a coating layer of between 10 and 1000 μm) so that the filter disk is not prone to adhere the filter residue. The direct dynamic filtration method (also called thin layer filter cake filtration or restricted filter cake filtration) is different from the conventional filter cake layer filtration in their principles. The dynamic filtration enables the slurry to flow in parallel to a surface of a filter medium (as shown in FIG. 3), so that the solid particles are not prone to accumulate on the surface of the filter medium and a relatively high filtration rate is ensured. The dynamic filtration is a filtration process alternate between a filter cake filtration and non-filter cake layer filtration. A fundamental purpose of the dynamic filtration is that the formation of the filtration cake is prevented or only a thin layer of filtration cake is formed during the filtration process in order to avoid the enlargement of a filtration resistance and the decrease of the filtration rate resulted from the thickening of the filtration cake.

Preferably, a filtration temperature of the dynamic filter in 2) is controlled at between 200 and 250° C., a pressure thereof is controlled at between 3.0 and 3.5 MPa (G), and filtration accuracy thereof is controlled at between 5 and 10 μm.

The dynamic filter 5 is provided with a variable frequency motor (with a rotational speed range of between 10 and 300 rpm). The rotational speed of the dynamic filter 5 is controlled at between 10 and 100 rpm in conditions of normal filtration and at between 100 and 300 rpm in conditions of removing the filter residue. The direct dynamic filtration method enables the dynamic filter 5 to be applicable for long term removal and purification of large quantities of particle substances. After the product from the bottom outlet of the reactor being filtered by the dynamic filter 5, undissolved shed noble metals or unbroken solid noble metal catalysts can be discharged from the conical bottom part of the filter and can be recovered for use by regeneration treatment. The liquid phase product after the filtration contains a part of broken catalysts in small particles and noble metal ions, and the liquid phase product then enters the second filtration buffer tank 6. The second filtration buffer tank 6 is provided with a bottom outlet and a top outlet. The top outlet is a liquid or gas outlet, and the bottom outlet is a liquid-solid two-phase outlet. The product from the bottom outlet is introduced into the refining filter 7 for product refining.

The inner filter 2 is capable of preventing the unbroken noble metal catalysts from discharging out of the reactor. The liquid reaction product in the upper part of the reactor is filtered by the inner filter 2 and is discharged from the reactor. The liquid product carries catalysts in small broken particles and noble metal ions dissolved in the product. To ensure the quality of the product, the liquid product after passing through the inner filter 2 is introduced from the reactor into the first filtration buffer tank 4. The first filtration buffer tank is provided with a top outlet and a bottom outlet. The top outlet can be a liquid phase or gas phase outlet. The bottom outlet discharges a liquid phase product containing the catalyst in small broken particles and noble metal ions. The product from the bottom outlet enters the refining filter 7 for product refining so as to achieve the purpose of removing and recovering the broken catalysts and the dissolved noble metal ions from the liquid product.

Figure 4:
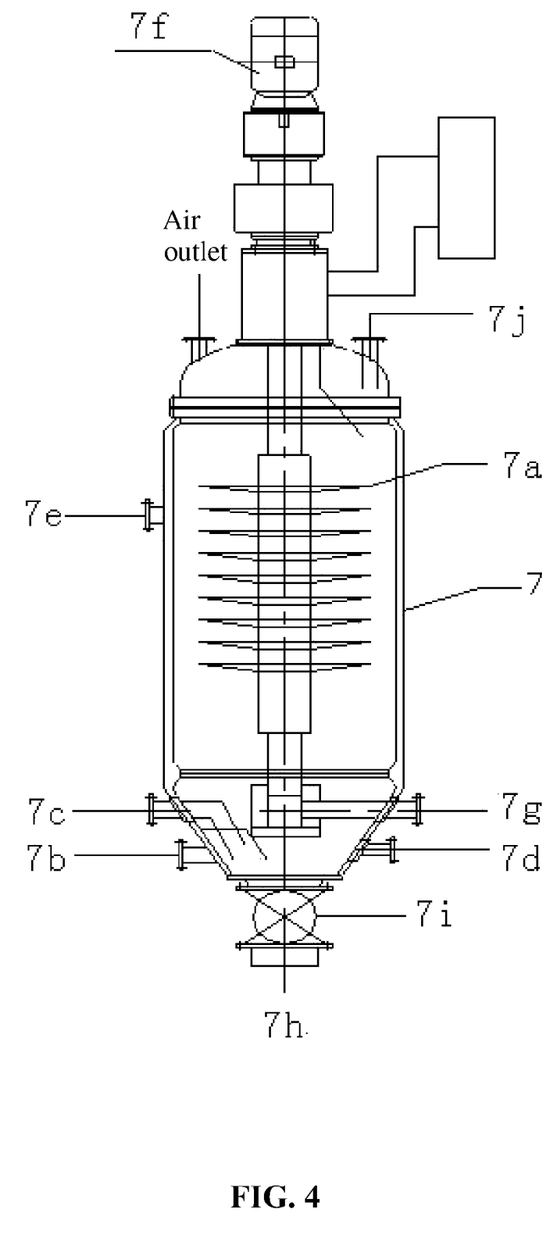
FIG. 4 is a schematic diagram of a refining filter of the invention.

FIG. 4 is a schematic diagram of the product refining filter. The refining filter 7 comprises a filter disk 7a, a condensate outlet 7b, a filtrate outlet 7g, a slurry inlet 7c, a vapor inlet 7e, a variable frequency motor 7f (with a rotational speed of between 10 and 300 rpm), a remaining material outlet 7d, a spare material inlet 7j, a bottom outlet 7h, and an outlet ball valve 7i.

The new process combining with the product refining process and the filter cake filtration is adopted, not only is the product prevented from carrying catalysts of small particles, but also the product is refined to remove the noble metal impurity ions. The filter adopts the clay refining process. A clay filter cake is formed in the refining filter 7 before the filtration of the product. The clay and a filtrate supernatant (can also be replaced by diesel in the absence of the filtrate supernatant) are stirred and mixed in a precoating mixing tank 8 and are transported to the refining filter 7 via a pump. The valves F2, F4, F6, F7, F8, and F10 are closed and the valve F5 is opened. When all the filter disks of the filter are immersed by a mixed solution containing the clay, a filtrate outlet valve F7 of the filter is opened, so that the mixed solution flows back to the precoating mixing tank 8, and a circulating loop of the mixed solution is formed among the precoating mixing tank, the pump, and the refining filter 7. The mixed solution circulates in the circulating loop and a circulation time is approximately between 1 and 10 hrs. When a thin layer of the clay filter cake is formed on an upper surface of the filter disk, the circulating flow of the mixed solution is increased. The clay filter cake is compacted, and the supernatant is discharged. A thickness of the clay filter cake layer relates to a concentration of the clay in the mixed solution and is generally between 1 and 30 mm. After formation of the clay filter cake layer, the valves F5, F7 are closed, the refining product outlet valve F8 is opened, and then the valve F2 or F4 is opened so as to start filtration of the liquid product from the first filtration buffer tank 4 or from the second filtration buffer tank 6. The small particle impurities including the waste catalysts in the liquid product are attached to the clay filter cake. A lower surface of the filter disk is coated with nanomaterials (the polytetrafluoroethylene (teflon), the nanoceramic, SiC, $Si_3N_4$, and the modified nanoscale $SiO_2$, with a thickness of the coating layer of between 10 and 200 μm). The small particle impurities including the waste catalysts are not prone to adhere to the lower surface of the filter disk, thereby being beneficial for removing the filter residue. The product refining filter 7 adopts static filtration. When a filtration pressure difference reaches 1.0 MPa which is a maximum allowable pressure difference of the filter disk, the valves F2 and F4 are closed, a variable frequency motor 7f is started to remove the layer of the clay filter cake from the filter disk so as to shed the clay and the filter residue down to a conical part of a bottom part of the refining filter 7. A bottom outlet of the refining filter 7 is opened to discharge the clay and the filter residue. After the discharge of the clay and the filter residue, the formation process of the clay filter cake is repeated; and when the clay filter cake is formed, a next filtration operation is performed. The spare material inlet 7j arranged on the top of the refining filter 7 is a spare inlet for feeding materials. When solid deposits are disposed at the bottom part of the refining filter 7 and the material inlet of the bottom part is blocked, the valve F10 arranged on a pipeline corresponding to the spare inlet can be opened to serve as a precoating mixed solution inlet or a material inlet of the filtration process. As the process is conducted in sealed condition, the production efficiency is high. The filtration means from outside to inside and the conical structure of the lower part of the container are beneficial for the discharge of waste residues such as the broken catalyst and the noble metals. The refining filter 7 has high filtration accuracy, the filtrate is clarified, and the refining of the liquid product is realized.

Example 1

Recovery of a cobalt-based catalyst from a Fischer-Tropsch slurry bed. The average grain size of the catalyst is approximately 106 μm. Undeactivated or deactivated catalyst in the upper part of the reactor passes through an inner filter along with a reaction product. A filtration accuracy of the inner filter reaches between 15 and 35 μm. A major part of the catalyst is retained in the reactor, and only a very small part of the broken catalyst flows out of the reactor along with the reaction product via an upper outlet of the reactor to enter a first filtration buffer tank. The deactivated catalyst in the bottom part of the reactor flows out of a bottom outlet of the reactor along with the reaction product to enter a dynamic filter and is directly filtered at the temperature of between 200 and 250° C. and the pressure of 3.0 MPa (G). A filtration accuracy of the dynamic filter reaches approximately 5 μm, and a major part of the catalyst is recovered. Products in the bottom part containing a very small part of the broken catalyst enter a second filtration buffer tank. The reaction products in the first filtration buffer tank and the second filtration buffer tank are cooled and are transported to a product refining filter for conducting a secondary filtration at the temperature of 160° C. and a pressure of 0.6 MPa (G). A filtration accuracy of the product refining filter reaches approximately 0.1 μm. The recovery rate of the waste catalyst using the combined filtration process reaches 98 wt. %. In condition that the catalyst has uniformly distributed grain size and high strength, the recovery rate of the waste catalyst can reach 99 wt. % above.

Example 2

The filtration of wax slurry containing a solid cobalt-based catalyst. The temperature of the wax slurry is 300° C., a pressure is 4.0 MPa (G), and an average grain size of the solid cobalt-based catalyst is approximately 99 μm. The wax slurry is introduced into a dynamic filter and is directly filtered at the temperature of 300° C. and a pressure of 4.0 MPa (G). The dynamic filter has a filtration accuracy of approximately 10 μm, and a major part of the catalyst is recovered. A bottom product containing a very small part of broken catalyst is introduced into a filtration buffer tank where the reaction product is cooled, and is then transported to a refining filter where a second filtration is conducted at the temperature of 180° C. and a pressure of 0.7 MPa (G) and the filtration accuracy reaches approximately 0.4 μm. The method using the combined filtration process enables the recovery rate of the waste catalyst to reach 97 wt. %. If the catalyst has uniformly distributed grain size and relatively high strength, the recovery rate of the waste catalyst will be further increased.

Example 3

The filtration of wax slurry containing a solid cobalt-based catalyst. The temperature of the wax slurry is 350° C., a pressure is 4.5 MPa (G), and an average grain size of the solid cobalt-based catalyst is approximately 90 μm. The wax slurry is introduced into a dynamic filter and is directly filtered at the temperature of 350° C. and a pressure of 4.5 MPa (G). The dynamic filter has a filtration accuracy of approximately 17 μm, and a major part of the catalyst is recovered. A bottom product containing a very small part of broken catalyst is introduced into a filtration buffer tank where the reaction product is cooled, and is then transported to a refining filter where a second filtration is conducted at the temperature of 190° C. and a pressure of 0.8 MPa (G) and the filtration accuracy reaches approximately 0.8 μm. The method using the combined filtration processes enables the recovery rate of the waste catalyst to reach 96 wt. %. If the catalyst has uniformly distributed grain size and relatively high strength, the recovery rate of the waste catalyst will be further increased.

Example 4

The filtration of wax slurry containing a solid cobalt-based catalyst. The temperature of the wax slurry is 400° C., a pressure is 5.0 MPa (G), and an average grain size of the solid cobalt-based catalyst is approximately 75 μm. The wax slurry is introduced into a dynamic filter and is directly filtered at the temperature of 400° C. and a pressure of 5.0 MPa (G). The dynamic filter has a filtration accuracy of approximately 25 μm, and a major part of the catalyst is recovered. A bottom product containing a very small part of broken catalyst is introduced into a filtration buffer tank where the reaction product is cooled, and is then transported to a refining filter where a second filtration is conducted at the temperature of 200° C. and a pressure of 1.0 MPa (G) and the filtration accuracy reaches approximately 1.0 μm. The method using the combined filtration process enables the recovery rate of the waste catalyst to reach 95 wt. %. If the catalyst has uniformly distributed grain size and relatively high strength, the recovery rate of the waste catalyst will be further increased.

Example 5

The recovery of an iron-based catalyst from a Fischer-Tropsch slurry bed. A liquid-solid (or gas-liquid-solid three phase) product passes through an inner filter arranged on an upper part of the reactor. The inner filter has a filtration accuracy of between 15 and 35 μm so that a major part of the catalyst is retained in the reactor, and only a small part of broken catalyst is discharged out of the reactor along with the product. Deactivated catalyst in a bottom part of the reactor is directly filtered by a self-made dynamic filter at the temperature of between 250 and 270° C. in order to recover a major part of the catalyst. A filtration accuracy of the dynamic filter reaches between 1 and 25 μm. A bottom product containing a very small part of broken catalyst and an upper product containing a very small part of broken catalyst are cooled to a temperature of 160° C., and are transported to a self-made product refining filter 7. A filtration accuracy of the self-made product refining filter 7 is a solid content of the catalyst in the product and is between 0.1 and 1 μm. The method enables a recovery rate of the waste catalyst to be 95 wt. % above. If the catalyst has uniformly distributed grain size and relatively high strength, the recovery rate of the waste catalyst will be further increased.

Example 6

The recovery of a rhodium catalyst from oxo synthesis reaction of syngas in preparation of butanol and octanol. A conventional method for recovering the waste catalyst comprises: separating a catalyst from a crude product by evaporation, cooling the product into a liquid state, and repeating the above process. If the self-made filter with high filtration accuracy of the technology is utilized, the separation of the catalyst from the product can be realized, and a large amount of heat quantity necessitated by the evaporation system can be salved and the cooling system can be deleted. Not only can the liquid phase circulation be realized, but also the energy consumption of the apparatus and the fixed asset investment can be largely decreased. The liquid product circulation can be relatively realized, and in the meanwhile the waste catalyst can be repeatedly used and recovered for utilization. The recovery rate of the waste catalyst reaches 95 wt. % above.

The recovery effects of the Examples are listed as Table 1.

Preferably, for the recovery of cobalt-based catalyst from the Fischer-Tropsch slurry bed, the dynamic filtration temperature is controlled at between 200 and 250° C. and a pressure range of between 3.0 and 3.5 MPa (G).

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A method for separating solid noble metals, noble metal particles, and noble metal ions from Fischer-Tropsch synthesis products, the method comprising:
   1) continuously filtering a reaction product in a Fischer-Tropsch synthesis reactor though an inner filter arranged at an upper portion of the Fischer-Tropsch synthesis reactor and obtaining a filtered reaction product; discharging the filtered reaction product to a first filtration buffer tank via an upper outlet of the Fischer-Tropsch synthesis reactor; separating a gas phase product or a part of a liquid phase product from the filtered reaction product and discharging the gas phase product or the liquid phase product from a top of the first filtration buffer tank to a product outlet; and discharging a liquid-solid two-phase product from a bottom part of the first filtration buffer tank;
   2) introducing a liquid phase product containing a catalyst slurry from a bottom part of the Fischer-Tropsch synthesis reactor to a dynamic filter and obtaining solid noble metals and a filtered liquid phase product, the filtered liquid phase product comprising a waste catalyst in the form of small broken particles and noble metal ions; discharging the filtered liquid phase product from a bottom part of the dynamic filter and introducing the filtered liquid phase product to a second filtration buffer tank; and discharging the liquid phase product from a bottom part of the second filtration buffer tank; and
   3) transporting clay to a refining filter and forming a clay filter cake on a filter disk of the refining filter; and
   4) transporting the liquid-solid two-phrase product obtained in 1) and the liquid phase product obtained in 2) to the refining filter, and refining the liquid-solid two-

TABLE 1

Comparisons of recovery effects between Examples 1-6

| Example number | Average grain size of catalyst μm | Dynamic filter | | | Refining filter | | | Solid content rate in product | Recovery rate of waste catalyst |
|---|---|---|---|---|---|---|---|---|---|
| | | Operating pressure MPa | Operating temperature ° C. | Filtration accuracy μm | Operating pressure MPa | Operating temperature ° C. | Filtration accuracy μm | | |
| 1 | 106 | 3.0 | 200-250 | 5 | 0.6 | 160 | 0.1 | Decreased by 97.6 wt. % | 98 wt. % |
| 2 | 99 | 4.0 | 250-300 | 10 | 0.7 | 180 | 0.4 | Decreased by 96.5 wt. % | 97 wt. % |
| 3 | 90 | 4.5 | 300-350 | 17 | 0.8 | 190 | 0.8 | Decreased by 95.3 wt. % | 96 wt. % |
| 4 | 75 | 5.0 | 350-400 | 25 | 1.0 | 200 | 1.0 | Decreased by 94.2 wt. % | 95 wt. % | phrase product obtained in 1) and the liquid phase product obtained in 2) to separate noble metal particles and noble metal ions.

2. The method of claim 1, wherein the liquid-solid two-phase product obtained in 1) is cooled to a temperature of 180±20° C. in the first filtration buffer tank before the liquid-solid two-phase product is transported to the refining filter.

3. The method of claim 1, wherein the dynamic filter in 2) has a filtration temperature of 200 and 400° C., a pressure of 3.0 and 5.0 MPa (G), and a filtration accuracy of between 1 and 25 μm.

4. The method of claim 2, wherein the dynamic filter in 2) is provided with a variable frequency motor; a rotational speed of a filter disk is controlled at between 10 and 100 rpm in conditions of normal filtration and at between 100 and 300 rpm in conditions of removal of filter residues; and the dynamic filter has a dynamic filtration process alternating between filter cake filtration and non-filter cake filtration.

5. The method of claim 2, wherein
the formation of the clay filter cake comprises: stirring and mixing the clay in a precoating mixing tank, transporting the clay into the refining filter via a pump; increasing a circulating flow of a clay mixture when the filter disk of the refining filter is totally immersed by the clay mixture and a thin layer of the clay filter cake is formed on a surface of the filter cake; compacting the clay filter cake; and discharging the clay mixture.

6. The method of claim 2, wherein the refining filter in 3) has a filtration temperature of between 100 and 200° C., a pressure of between 0.6 and 1.0 MPa (G), and a filtration accuracy of between 0.1 and 1 μm.

7. The method of claim 5, wherein
when a filtration pressure difference reaches 1.0 MPa which is a maximum allowable pressure difference of the filter disk, all inlet valves of the refining filter are closed, a centrifuge is started to remove the layer of the clay filter cake from the filter disk so as to shed the clay and the filter residue down to a conical part of a bottom part of the refining filter, and a bottom outlet of the refining filter is opened to discharge the clay and the filter residue; and
the formation process of the clay filter cake is repeated after the discharge of the clay and the filter residue and a next filtration operation is conducted after the formation of the clay filter cake.

8. The method of claim 4, wherein
the formation of the clay filter cake comprises: stirring and mixing the clay in a precoating mixing tank, transporting the clay into the refining filter via a pump; increasing a circulating flow of a clay mixture when the filter disk of the refining filter is totally immersed by the clay mixture and a thin layer of the clay filter cake is formed on a surface of the filter cake; compacting the clay filter cake; and discharging the clay mixture.

9. The method of claim 6, wherein
when a filtration pressure difference reaches 1.0 MPa which is a maximum allowable pressure difference of the filter disk, all inlet valves of the refining filter are closed, a centrifuge is started to remove the layer of the clay filter cake from the filter disk so as to shed the clay and the filter residue down to a conical part of a bottom part of the refining filter, and a bottom outlet of the refining filter is opened to discharge the clay and the filter residue; and
the formation process of the clay filter cake is repeated after the discharge of the clay and the filter residue and a next filtration operation is conducted after the formation of the clay filter cake.

10. The method of claim 2, wherein the dynamic filter in 2) has a filtration temperature of 200 and 250° C., a pressure of 3.0 and 3.5 MPa (G), and a filtration accuracy of between 5 and 10 μm.

11. The method of claim 1, wherein a filtration accuracy of the inner filter is between 15 and 35 μm.

\* \* \* \* \*